March 29, 1966  J. V. WALLACE, JR  3,242,777
ENGINE LATHE ATTACHMENT
Filed March 18, 1964
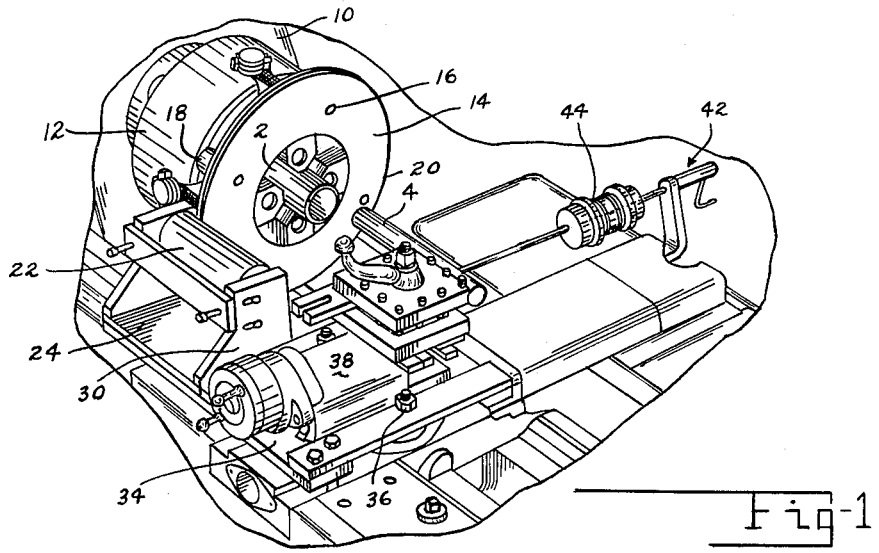
Fig-1
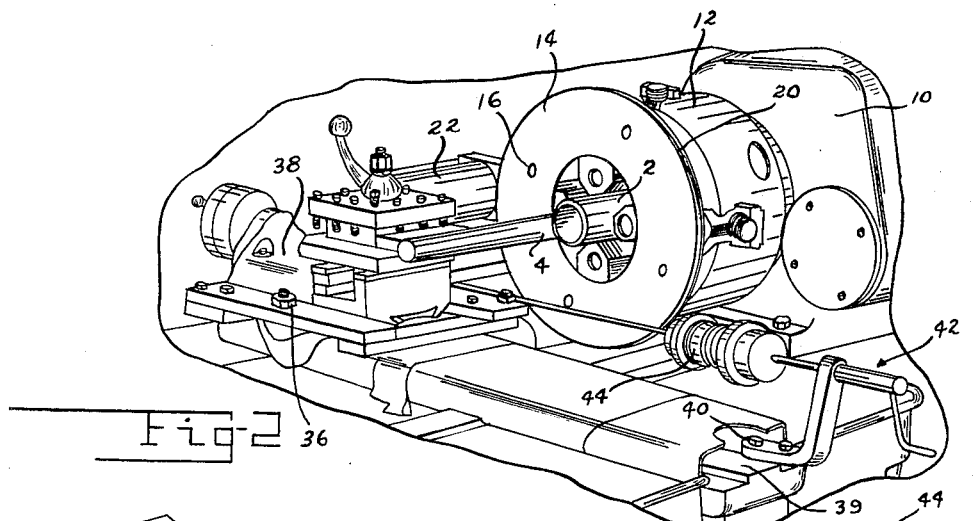
Fig-2
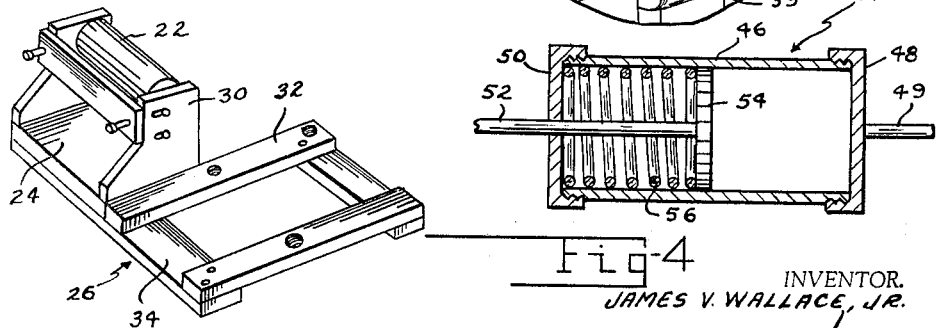
Fig-3
Fig-4
INVENTOR.
JAMES V. WALLACE, JR.
BY
ATTORNEYS

3,242,777
ENGINE LATHE ATTACHMENT
James V. Wallace, Jr., 326 Mink Drive,
San Antonio, Tex. 78201
Filed May 18, 1964, Ser. No. 368,431
2 Claims. (Cl. 82—14)

The invention described herein may be manufactured and used by or for the United States Government for governmental purposes without payment to me of any royalty thereon.

This invention is directed to lathe attachments and in particular to an attachment for an engine lathe useful for shaping workpieces into out-of-round configuration.

To use a conventional engine lathe to turn elliptical or oval shaped surfaces, various types of lathe attachments have been employed. None has been found entirely satisfactory, principally for the reason that the time consumed per workpiece in the lathe operation in adjusting and using such attachments has exceeded that necessary to meet economic considerations, even for small production quantities. It is, therefore, the purpose of the present invention to overcome the stated obstacle by utilizing a novel attachment for a conventional engine lathe for out-of-round machining providing means to ensure rotation of the lathe cutting tool in a predetermined noncircular path while machining the workpiece.

It is an object of the invention to provide means to mass produce out-of-round pieces on an engine lathe, with only minor adjustment required by the lathe operator.

It is a further object of the invention to provide a lathe attachment to cut noncircular pieces without interfering with the operator's ability to machine circular pieces as necessary with only minor alteration to the lathe so equipped.

These and other objects of the invention will readily appear from the detailed description set forth showing a preferred embodiment of the invention wherein in the accompanying drawings:

FIG. 1 shows a partial frontal perspective view of the lathe attachment as mounted on the lathe headstock and a portion of the lathe bed, together with the cross and compound slides.

FIG. 2 is a partial perspective obliquely from the rear showing the relationship between elements from a point of view different from FIG. 1.

FIG. 3 is a perspective of the box frame construction of the lathe bed attachment, consisting of the roller cage and the cross slide mount.

FIG. 4 is a section of a spring assembly such as used in the device of FIG. 1.

With specific reference to the drawing of FIG. 2, there is illustrated the headstock 10 of a conventional lathe (shown fragmentarily) with a standard chuck 12 attached thereto. Cam plate 14 is secured to the chuck 12 of the lathe by means of counterbored bolts 16 such that the axis of rotation of the cam plate is on the axis of rotation of the lathe, and the cam plate is axially separated from the face of said chuck by spacers 18. The cam plate 14 is characterized by the predetermined cam 20 machined on the periphery thereof.

Arranged to follow the cam 20 of the cam plate is a cam follower, such as cylindrical roller 22, located on an axis parallel to the axis of rotation of the chuck 12. The roller 22 is journaled in bearings supported by adjustable bearing blocks 30 in a first or roller cage portion 24 of the box construction frame shown generally at 26 in FIG. 3. The cam roller is long enough to insure that the cam roller stays in contact with the cam 20 as the cutting tool 4 is moved axially on the workpiece 2.

The second or remaining portion 32 of the box frame is anchored to the cross-slide 34 of the lathe by the lathe bolts 36 which attach the compound slide 38 to the cross-slide of the depicted engine lathe. The frame of the present attachment is thus shown to be firmly supported on the compound slide of the engine lathe and does not interfere with its operation in any manner.

Crank assembly 42 is located on the back portion of the cross-slide bed spaced from the roller cage 24 and attached to the cross-slide bed 39 by bolts 40. Biasing means such as spring assembly 44 is positioned between the roller cage 24 and the crank 42 to urge by tension the cross-slide supporting the box frame 26 toward the crank assembly in such a manner so as to urge roller 22 against and in following relation to the cam 20. The spring assembly 44, illustrated in FIG. 4, includes a hollow cylinder 46, having a first cap 48 closing one end and a similar cap 50 closing the opposite end. The cap 48 is, in my preferred embodiment, welded or otherwise secured to a rod 49 attached to the adjusting crank means 42. The cap 50 has a central hole, through which rod 52 is slidably mounted. Attached axially and normal to the end of the rod, internal to the cylinder, is a circular plate 54. A compression spring 56 is axially mounted on the rod 52 between the internal side of cap 50 and the plate 54. The opposite end of rod 52 is attached to the roller cage portion 24 of the box frame 26. The crank 42 is turned to draw the spring assembly 44 toward the crank assembly, thus increasing the compression on the spring element 56, thereby increasing the pressure of the roller on the cam. It is to be understood that the particular crank assembly used may be any device which will draw the rod 49 to compress the spring element 56; for example, rod 49 could be threaded into the crank.

Once the attachment is secured to the lathe and the workpiece aligned, the only adjustments which need be made are (a) the lateral adjustment of the cutting tool to produce the proper sized finished piece, any required change being made by adjusting the feed screw of the cross-slide and locking the same in proper fixed position; and (b) adjustment of the biasing means to obtain the proper tension to hold the cam follower against the cam.

Throughout the machining operation, the roller stays in contact with the cam, thus guiding the cutting tool to generate the required configuration on the workpiece. Any minor adjustment necessary due to the diameter of the workpiece or any required tool movement is made by the compound slide. The crank may be used to increase or decrease the compression of the spring.

A typical use of this attachment is in the making of piston rings, which are customarily made out-of-round in order to attain better sealing characteristics. Since the cutting tool will follow the cam plate as a linear function of the cam lift, the difference between the major and minor diameter of the cam plate should be made equal to the desired difference between the major and minor axes on the finished piston rings. Specifically, such a piston ring cutting operation is performed in the following manner using my novel lathe attachment:

(a) A long workpiece 2 is checked in the standard lathe chuck 12 with a portion of the piece protruding beyond the face of the chuck in the direction of the lathe tool 4. With the tool positioned in the proper position to effect the cut depth desired, the roller is positioned to ride on the cam and the crank operated to properly tension the roller on the cam. The piece is then turned out-of-round as required.

(b) The tool is then repositioned on the compound slide, a boring tool inserted and a central hole bored into the piece to a depth approximately equal to the distance the piece protrudes from the chuck.

(c) A slicing tool is then used to cut a number of rings in succession by cutting the piece normal to the axis of the workpiece into the required widths.

(d) The remaining portion of the workpiece is then rechucked and steps (a) through (c) repeated as above.

It is apparent that, from a relatively long workpiece, a large number of rings can be turned out-of-round with a single initial attachment setting.

Having described the present invention, it is my intention to cover such various changes and modifications as are apparent to those skilled in the art without departing from the scope and spirit of the invention, such changes and modifications to be included within the appended claims.

I claim:

1. A lathe comprising: a headstock, a chuck supported for rotation by the headstock and adapted to support a workpiece; a cam plate, having a cam surface, carried by the chuck; a bed positioned adjacent the headstock; a cross-slide mounted for axial movement on said bed; a compound slide, with a cutting tool attached thereto, mounted on said cross-slide; a frame, including a roller cage, secured to said cross-slide; cam follower roller means, supported by said roller cage, for engaging said cam surface as the cutting tool is moved axially on the workpiece; biasing means secured at one end to said bed and at the other end to said cross-slide to thereby bias said cam follower roller means into contact with said cam surface and means for adjusting the force exerted by said biasing means.

2. The device of claim 1 in which the biasing means comprises: a hollow cylinder, one end of which having a first cap closing said cylinder, said cap attached to said adjusting means, and an opposite end thereof closed by a second cap having a central hole therethrough, a rod attached to said cross-slide and having a plate on the opposite end of said rod normal to the axis of said rod, a spring within said cylinder having the central axis of said spring disposed on the central axis of said rod and mounted between the internal side of said second cap and a side of said plate.

References Cited by the Examiner
UNITED STATES PATENTS

| | | | |
|---|---|---|---|
| 40,039 | 9/1863 | Howard | 82—14 |
| 57,158 | 8/1866 | Linniatt | 82—14 |
| 1,976,459 | 10/1934 | Quichon | 82—14 |
| 2,017,513 | 10/1935 | Shatkin | 82—14 |

WILLIAM W. DYER, JR., *Primary Examiner.*

G. A. DOST, *Assistant Examiner.*